Oct. 10, 1950     H. G. TRAVER     2,524,943
PLOW AND PULVERIZER
Filed Feb. 2, 1946     3 Sheets-Sheet 2
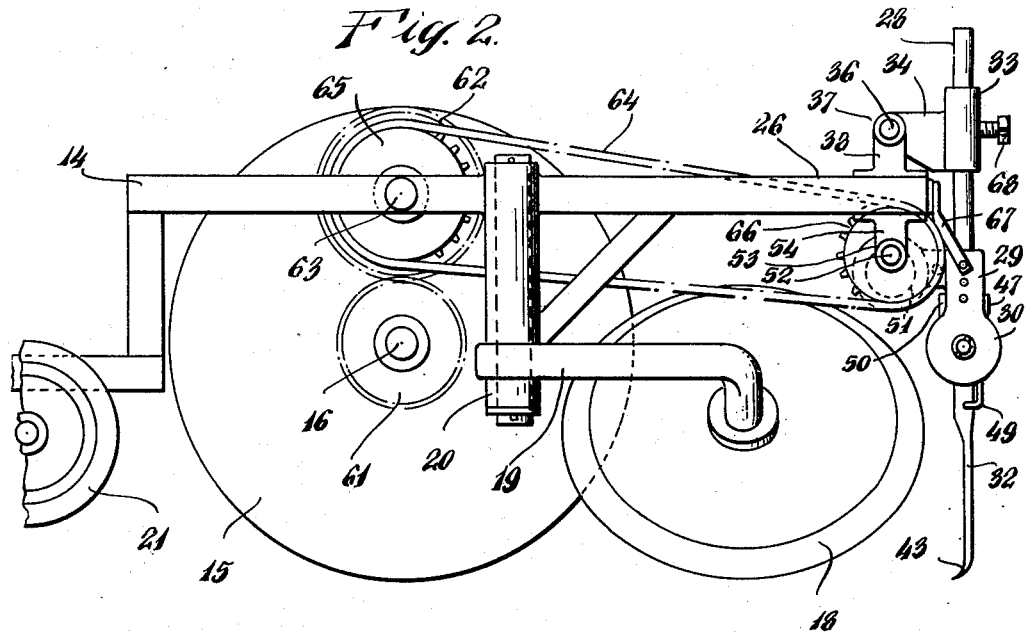
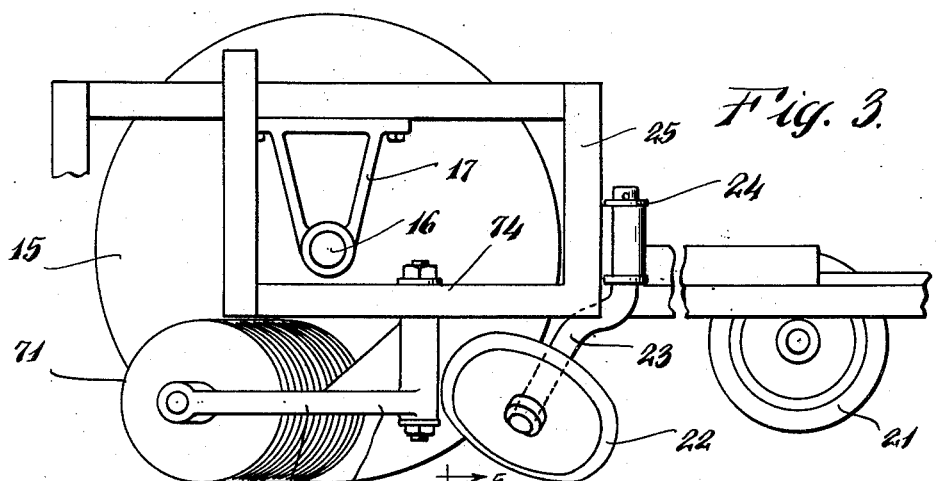
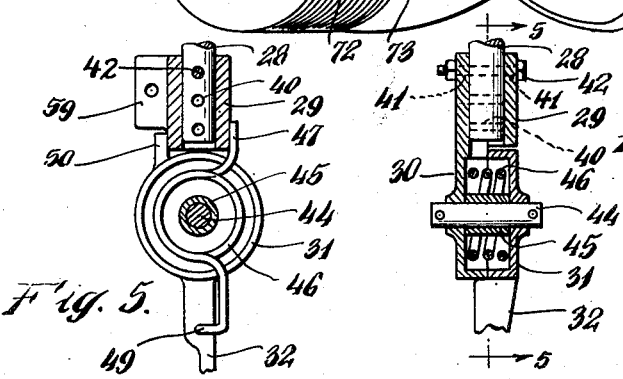
INVENTOR.
H. G. Traver
BY
John A. Seifert
ATTORNEY Oct. 10, 1950   H. G. TRAVER   2,524,943
PLOW AND PULVERIZER
Filed Feb. 2, 1946   3 Sheets-Sheet 3
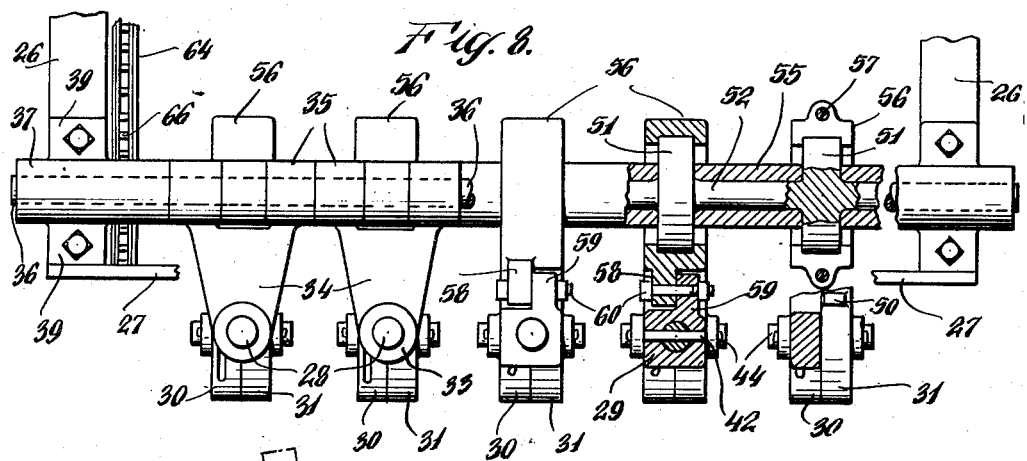
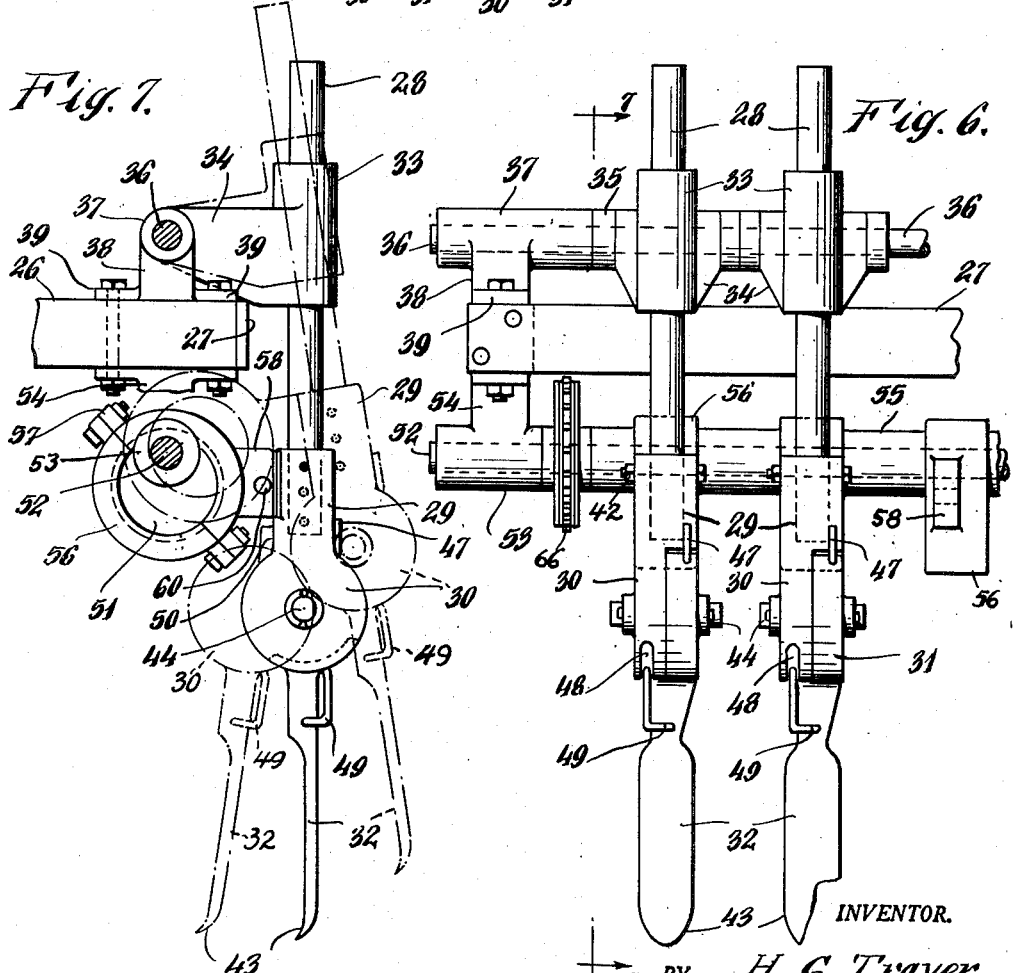
INVENTOR.
BY H. G. Traver
John A. Seifert
ATTORNEY.

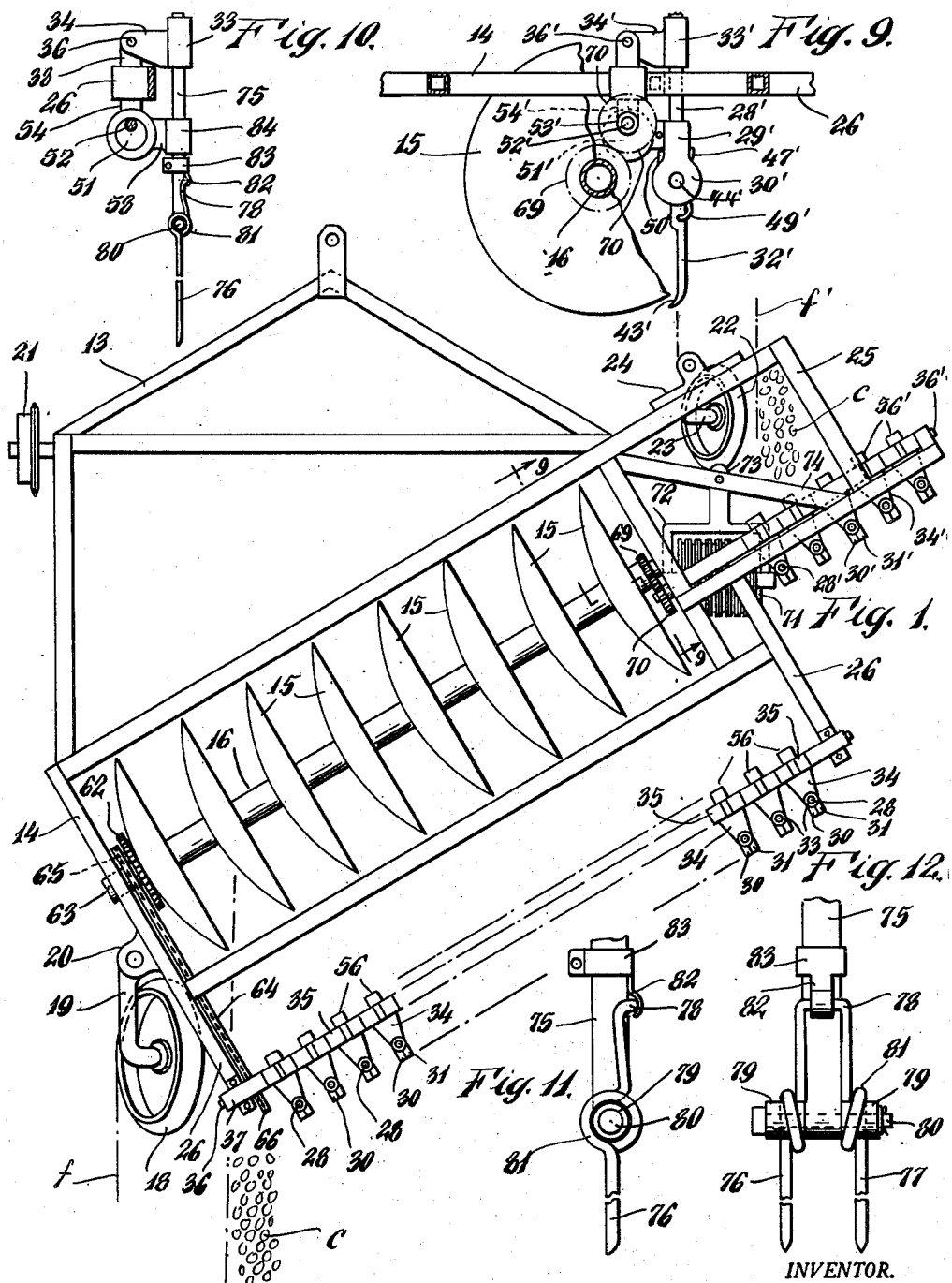

Patented Oct. 10, 1950

2,524,943

UNITED STATES PATENT OFFICE 2,524,943

PLOW AND PULVERIZER

Harry G. Traver, Cranford, N. J.

Application February 2, 1946, Serial No. 645,131

9 Claims. (Cl. 97—45)

This invention relates to agricultural apparatus and particularly to soil tillage machines consisting of disk plows or a multi-share plow wherein a furrow is formed at one side of the strip of land being worked and the soil is turned from the furrow to the opposite side of said strip of worked land. This type of tilling leaves the soil in an uneven and cloddy condition, so that it is necessary to harrow said tilled or plowed land requiring additional apparatus and time.

It is an object of the present invention to eliminate this requirement for additional apparatus and time to harrow the plowed land by providing means carried by the tillage machine to break up the clods, level the plowed soil and move the unbroken clods toward the furrow of the strip of land being worked, so that the plowed strips will contain only fine top soil and the plant roots may readily penetrate the soil.

It is another object of the invention to provide means to break up clods, level the plowed soil and move unbroken clods toward the furrow of the strip being worked, and mount said means on a tillage machine whereby said means will exert a side thrust counteracting the usual side thrust exerted by the plows against the forward movement of the tillage machine and effect forward movement of said tillage machine in a straight path.

It is a further object of the invention to provide novel tooth members carried by the frame of the tillage machine in spaced relation to each other and yieldingly urged to land working position and adapted to be moved out of said working position by an immovable obstruction to prevent damage to the tooth members and the frame of the tillage machine.

It is still a further object of the invention to movably mount the tooth members on the frame and impart movement to said tooth members in an elliptical path in a direction opposite to the direction of travel of the machine to break up the clods and move the unbroken clods toward the furrow of the strip of land being worked.

Another object of the invention is to provide a row of soil working tooth members, some of said members being actuated in an elliptical path while others are in fixed position, the number of movable and fixed tooth members being varied to suit different soil conditions.

Another object of the invention is to break clods, level the plowed soil and move the unbroken clods toward the furrow of the strip of land being worked, and to move the unbroken clods into a furrow of a previously worked strip of land before soil is turned over said latter furrow from the strip of land being worked.

Another object of the invention is to crush and compress the unbroken clods deposited in the furrow of the previously worked strip of land before soil is turned over said unbroken clods from the strip of land being worked.

A further object of the invention is to transmit the forward movement of the tillage machine into elliptical movement to spaced tooth members.

Further objects and advantages of the invention will be disclosed in the detailed description of the invention.

In the drawings accompanying and forming a part of this application, Figure 1 is a view looking at the top of a tillage machine showing the present invention embodied in said machine.

Figure 2 is a side elevational view, on an enlarged scale, looking in axial alinement of the plows, of a portion of the tillage machine showing an operative driving connection between the plows and a row of tooth members movably supported by the tillage machine, and means for securing the tooth members in fixed position when said members are disconnected from the driving connection.

Figure 3 is a side elevational view, on an enlarged scale, looking in axial alinement of the plows at the opposite side of another portion of the tillage machine showing a roller for crushing and compressing unbroken clods deposited in a furrow of a previously worked strip of land.

Figure 4 is a fragmentary view partly in section of an adjustable mounting of a socket of a tooth member on a shank and a yielding pivotal connection between a scraper tooth and said socket.

Figure 5 is a sectional view taken on the line 5—5 of Figure 4 looking in the direction of the arrows.

Figure 6 is an elevational rear view, on an enlarged scale, of two tooth members at one end of a row of said members.

Figure 7 is a sectional view taken on the line 7—7 of Figure 6 looking in the direction of the arrows and showing in broken lines the positions of a tooth member in its elliptical path of movement.

Figure 8 is a plan view of the tooth members with three of said members in section taken on three different horizontal planes.

Figure 9 is a sectional view taken on the line 9—9 of Figure 1 looking in the direction of the arrows showing tooth members for moving unbroken clods into the furrow of a previously worked strip of land.

Figure 10 is an elevational view of a modification of tooth member connected to the actuating means therefor.

Figure 11 is a fragmentary view of the modification of tooth member shown in Figure 10.

Figure 12 is an elevational view of said modification looking at the right hand side of Figure 11.

The embodiment of the invention is illustrated in the accompanying drawings in conjunction with rotary disk plows consisting of a frame including a hitch portion 13 adapted to be releasably connected to suitable propelling means (not shown), such as a tractor, and a rectangular portion 14 extending transversely and obliquely of the path of travel of the propelling means. A series of concavo-convex disks 15 are fixedly mounted in spaced relation to each other on a shaft 16 rotatably supported at the opposite end portions in bearings 17 carried by the opposite end members of the rectangular frame portion 14. The forward movement of the frame 13, 14 will propel the disks through the soil to form a furrow f at the left hand side of the strip of land being worked, looking at Figure 1, and turn the soil toward the opposite or right hand side of said strip. The plowing action of the disks will tend to move or exert a thrust on the frame 13, 14 toward the left hand side of the strip of land being worked, looking at Figure 1, or out of the path of travel of the propelling means. To overcome this side thrust of the disks, there is provided a wheel 18 having a rim sloping toward one side and rotatably supported on a laterally extending end portion of an arm 19 pivotally mounted at the opposite end portion in a bracket 20 fixed to the left hand end member of the frame portion 14, looking at Figure 1, so that the wheel 18 is adjustable on a vertical axis to follow and engage the outside or left hand wall of the furrow f. The side thrust of the disks 15 may be further overcome by a vertically flanged wheel 21 rotatably supported by the hitch portion 13 of the frame to travel on an unworked portion of the land at the left hand side of the strip of land being worked, and a wheel 22 similar to the wheel 18 but of smaller diameter rotatably supported by a laterally extending end of an arm 23 pivotally mounted at the opposite end portion in a bracket 24 fixed on an extension frame portion 25 at the right hand end member of the rectangular frame portion 14, so that the wheel 22 follows and engages the outside or left hand wall of a furrow f' of the adjacent preceding or previously worked strip of land.

The plow disks 15 will leave the worked soil at the rear of said disks full of clods and ridged along or adjacent to the furrow of the previously worked strip of land. The clods if left undisturbed will become dry and hard, and the fine plant roots cannot penetrate said dry and hard clods. Furthermore fertilizer does not mix with said clods even if the clods are moist. It has been the practice to break up the clods by propelling harrows over the land previously worked by a plow but this usually requires unhitching the plow from the tractor or team of horses and hitching the harrows to said tractor or team of horses and reworking the entire plowed field thereby doubling the time required to place the land in proper condition for planting.

To overcome this disadvantage of using additional harrows to break up the clods, there is provided devices carried by the plow frame in the rear of the plow and adapted to break up the clods and level the plowed soil, so that there will not be a ridge at the edge of the field as there would be if ordinary harrows were used. Said devices consist of a row of tooth members carried in spaced relation to each other by arms 26 extending rearwardly from the side members of the frame portion 14 and the free ends of said arms connected to each other and braced by a bar 27 secured at the end portions to said ends of the arms, as shown in Figures 6 and 7.

In Figures 1 to 8, inclusive, each tooth member comprises a shank 28, a socket 29 adjustably connected to one end of the shank and having an integral cup shaped portion 30 pivotally connected to a mating or correlated cup shaped portion 31 integral with a scraper tooth or blade 32 extending from the periphery of the cup shaped portion 31.

One end portion of the shank 28 is slidably supported by a sleeve 33 of a series of sleeves equal in number to the number of tooth members and said sleeve 33 having an integral arm 34 extending laterally from a peripheral portion of the sleeve and arranged at the free end with a boss 35 extending at a right angle to the sleeve 33 and rotatably engaged on a rod 36 mounted at the opposite end portions in an elongated boss 37 of a bracket arm 38 fixed to and extending above the free ends of the arms 26, as shown at 39 in Figure 8. The bosses 35 extend from the opposite sides of the arms 34 equal distances so that the ends of adjacent bosses will abut each other and equidistantly space the arms 34 from each other, as shown in Figures 1, 6 and 8.

The end portion of the shank 28 opposite the end portion slidably supported by the sleeve 33 is engaged in the socket 29 and adjustably connected to said socket by providing said end portion of the shank with a series of transversely extending holes 40, each hole being adapted to be positioned in register with alined openings 41 in diametrically opposite portions of the wall of the socket for the engagement of a headed bolt 42 releasably secured in said registered openings, as shown in Figures 4 to 8, inclusive. This adjustable connection between the shanks and sockets permits adjustment of the scraper blade 32 toward and way from the plowed soil and provides the desired amount of leveling of the plowed soil and breaking of the clods.

The scraper tooth or blade 32 has a flat face constituting the clod breaking and soil scraping face with the extremity curved forwardly and tapered to a scraping edge, as shown at 43 in Figures 2 and 7.

The cup portions 30 and 31 are pivotally connected to each other by a pivot pin 44 loosely engaged in axially alined openings in the cup portions and secured in said openings by suitable means, such as cotter pins engaged in the projecting end portions of the pivot pin 44, as shown in Figure 4. A spacer sleeve 45 may be engaged on the pivot pin within the cup portions to maintain the cup portions in proper spaced relation, as shown in Figures 4 and 5. The cup portions 30 and 31 when pivotally connected form an annular chamber for a coiled spring 46 having one end 47 extended through an opening in the side wall of the cup portion 31 to abut the socket 29 and the opposite end of the spring is extended through an elongated opening 48 in the cup portion 30 and the extremity of said latter end of the spring bent laterally to engage the scraper blade 32, as shown at 49. The spring 46 having the ends 47 and 49 abutting the socket 29 and scraper blade 32 will urge the scraper blade to rotate on the pivot pin 44 in a clockwise or forward direction, looking at Figure 7, and the scraper blade is normally maintained in vertical alinement with the shank 28 and socket 29 by an ear or lug projection 50 integral with and extending from the side wall of the cup portion 31 to abut the socket 29, as shown in Figures 5 and 7. The spring 46 will permit the scraper blade 32 to be moved in a counter clockwise or backward direction, looking at Figure 7, by an immovable obstruction, such as a rock or stump in the strip of land being worked, and after the tooth member has passed the obstruction by the forward travel of the plow frame 13, 14, the spring will urge the ear 50 into abutting relation with the socket 29 and the scraper blade to its normal clod breaking and soil leveling position. This yielding mounting of the scraper blade 32 will prevent damage to the blades and their supporting structure when a blade engages an immovable obstruction. The elongated opening 48 will permit the spring end 49 to move with the scraper blade 32.

The resistance of the plowed soil and clods to the forward movement of the tooth members will exert a thrusting force on the plow frame 13, 14 toward the right hand side of the strip of land being worked, looking at Figure 1, and will counteract the side thrust exerted on the plow frame by the plow disks 15.

To increase the clod breaking effectiveness of the scraper blades 32, movement is imparted to the blades in an elliptical path and in a clockwise direction, looking at Figure 7, or in a direction opposite to the direction of travel of the plow frame 13, 14, so that the blades will move the clods in a forward direction obliquely of the path of travel of the plow frame and toward the furrow *f* being formed by the plow disks 15. This is accomplished by a series of disks 51 eccentrically mounted in fixed equidistantly spaced relation on a shaft 52 rotatably supported at the opposite end portions in bearing sleeves 53 at an end of an arm 54 fixed at the opposite end to and suspended from the frame extension arms 26. The portion of the shaft 52 between the eccentric disks may be covered by sleeves 55. Each of the eccentric disks 51 is fixed on the shaft 52 in alinement with a tooth member 28—32 and is operatively and releasably connected to said tooth member by a split collar or strap member 56 removably secured in encircling engagement on the eccentric disk by bolts releasably secured in ears extending laterally from the periphery and adjacent to the mating edges of the split portions of said member, as shown at 57 in Figure 7. One of said split portions is provided with an ear 58 extending laterally from the periphery thereof and releasably connected to a corresponding ear 59 integral with and projecting from the socket 29 by a pin 60 releasably engaged in alined openings in said ears, as shown in Figure 8. The collar member 56 is split on an angle extending intermediate the vertical and horizontal axes to position one of the securing bolts 57 clear of the ear 58 and facilitate mounting of said member on the eccentric disk 51. The shaft 52 is rotated in a direction opposite to the direction of rotation of the plow disks 15 and by the rotation of said plow disks through a gear 61 fixed on one end of the shaft 16 and meshing with a gear 62 rotatably supported by a stud shaft 63 carried by an end member of the frame portion 14, as shown in Figures 1 and 2. Gear 62 is operatively connected to the shaft 52 by a sprocket chain 64 engaging a sprocket wheel 65 rotatable on the stud shaft 63 and connected to the gear 62, and a sprocket wheel 66 fixedly mounted on the shaft 52, as shown in Figures 1, 2, 6 and 8. The rotation of the shaft 52 will cause the eccentric disks 51 to revolve and actuate the tooth members 28—32 in an elliptical path, as shown in the broken line positions of the tooth member in Figure 7. In this movement of the tooth members, the shanks 28 will reciprocate in an arcuate path on the shaft 36 and will have a sliding movement in the sleeves 33, as shown in Figure 7.

Accordingly to the condition and type of soil being worked, it may be desirable to actuate some of the tooth members in an elliptical path while other tooth members are held stationary, or it may be desirable to have all the tooth members held against movement in an elliptical path. This desired result is readily accomplished by removing the pin 60 to disconnect the eccentric disk 51 from the tooth member and rigidly connecting the tooth member to the bar 27 by a brace 67 having one end releasably secured to the bar 27 and the other end releasably secured to the socket 29 by the pin 42, as shown in Figure 2. To further retain the tooth member against movement, the shank 28 is releasably secured in the sleeve 33 by a set screw 68, as shown in Figure 2. As will be readily understood, all the tooth members may be disconnected from all of the eccentric disks 51 and held stationary to extend vertically of the ground by the braces 67 and set screws 68, or predetermined tooth members, such as alternate tooth members, may be disconnected from their associated eccentric disks 51 and held stationary by the braces 67 and set screws 68 while the remaining tooth members are connected to and actuated by the eccentric disks 51 to travel in an elliptical path.

The tooth members in addition to breaking the clods and leveling the plowed soil will move the unbroken clods toward the furrow *f* and form a ridge of said unbroken clods along the inner or right hand edge of said furrow, as indicated at *c* in Figure 1.

To provide a level field after the plowing thereof, it is necessary to dispose of this ridge of unbroken clods and this is accomplished by depositing said unbroken clods in the furrow before the plow disks 15 turn the plowed soil of a successively plowed strip of land over the furrow. The ridge *c* of unbroken clods are pushed or moved into the furrow *f'* of a previously plowed strip of land by a second row of tooth members of the same construction and arrangement of parts as the tooth members 28—32 including the eccentric disks 51 and the operative connection 56—60 between the eccentric disks and the tooth members, all of the elements of said second row of tooth members being designated by primed reference numerals corresponding to the reference numerals indicating the corresponding elements of the first row of tooth members and eccentric disks. The shafts 36' and 52' of the second row of tooth members and eccentric disks are rotatably supported by the extension frame portion 25 to extend over the strip of previously plowed land and at the inner or right hand side of the furrow *f'*, as shown in Figure 1. The eccentric disks 51' are rotated by the rotation of the shaft 16 through a gear 69 fixed on the shaft 16 and meshing with a gear 70 fixed on the shaft 52', as shown in Figure 9, so that the shaft 52' will rotate in the same direction as the shaft 52 which is opposite to the direction of rotation of the shaft 16. The second row of tooth members 28'—32' are mounted on the extension frame portion 25 whereby said tooth members will move the ridge c of clods into the furrow f' before the plow disks 15 turn the plowed soil of the successively plowed strip of land over the unbroken clods deposited in said furrow f' by the tooth members 28'—32'.

To prevent the unbroken clods from interfering with the growth of the plant roots and provide a bed for collecting moisture to aid in the growth of the plant roots, the unbroken clods deposited in the furrow f' are crushed and compressed before the plowed soil is turned over into said furrow from the successively plowed strip of land by the plow disks 15. To obtain this result, a roller having the periphery thereof arranged with spaced grooves and ridges, as shown at 71 in Figures 1 and 3, is rotatably supported by a bifurcated frame 72 having a tongue portion 73 pivotally mounted on a member 74 extending diagonally of the extension frame portion 25. The roller 71 is positioned relative to the tooth members 28'—32', so that said tooth members will deposit the unbroken clods in the furrow f' in front of said roller, as shown in Figure 1.

Figures 10 to 12, inclusive, show a modification of the tooth members 28—32 and 28'—32' shown in Figures 1 to 9, inclusive, comprising a shank 75 slidably mounted at one end in the sleeve 33 or 33' and tines 76, 77 formed from a length of resilient material bent to U form having the bight portion bent outwardly and curved to correspond to the curvature of the shank, as shown at 78, and the leg portions intermediate the bight 78 and the tines 76, 77 coiled around collars 79 engaged on the projecting ends of a bolt 80 engaged in an opening in the end of the shank opposite the end mounted in the sleeve 33, as at 81. The tines 76, 77 are normally retained in vertical alinement with the shank 75 by a clip 82 engaging the bight 78 and having a collar 83 encircling and clamped to the shank. The shank 75 is releasably connected to the eccentric disk 51 or 51' by an integral enlarged portion or a collar fixed to a portion of the shank between the sleeve 33 and the collar 83, as shown at 84 in Figure 10, and having an ear releasably connected to the ear 58 or 58' of the split collar 56 or 56' by the pin 60 or 60'. The resiliency of the tines 76, 77 will permit said tines to be moved rearwardly or to the right, looking at Figures 10 and 11, by an immovable obstruction, such as a rock or stump, and after the obstruction has been passed, the inherent resiliency of the tines 76, 77 will return said tines to their normal vertical position.

The spacing of the scraper teeth 32 and 32' will permit the fine soil to pass between said teeth and will not disturb said fine soil to any great extent. The scraper teeth 32 and 32' extending in a row obliquely to the path of travel of the propelling means will dig out and strike the clods while they are moist and while some of the clods are not broken most of the clods are broken by repeated impacts of said teeth 32 and 32' with the clods.

Having thus described my invention, I claim:

1. In agricultural apparatus, a frame adapted to travel in a straight path, plow members mounted on the frame to form a furrow at one side of the path of travel of the frame and turn the plowed soil toward the opposite side of said path of travel, and tooth members, pivotally and slidably supported by the frame, at a side of the plow members to move unbroken clods into a previously plowed furrow preceding the turning of soil into said furrow by the plow members.

2. In agricultural apparatus, a frame adapted to travel in a straight path, tooth members pivotally and slidably supported by the frame, eccentrics rotatably supported by the frame, each eccentric releasably connected to a tooth member, and means operative by the travel of the frame and connected to the eccentrics to continuously rotate the eccentrics and impart elliptical movement to the tooth members in the direction of the travel of the frame to break up clods of plowed soil and move unbroken clods.

3. Agricultural apparatus as claimed in claim 2, wherein the tooth members are pivotally and slidably supported by the frame by sleeve members pivotally mounted on the frame and slidably supporting the tooth members, and means mounted in the sleeve members to engage and retain the tooth members against sliding movement in the sleeve members and in predetermined fixed position when said tooth members are disconnected from the eccentrics.

4. In agricultural apparatus, a frame, tooth members supported by the frame in a row, each member comprising a shank pivotally and slidably connected adjacent one end to the frame, a socket adapted to receive and be fixed to the opposite end of the shank and having a cup shaped portion, a scraper tooth having a cup shaped portion mating with and pivotally connected to the cup portion of the socket and the cup portion of the tooth being arranged with a projection to engage the socket and limit the pivotal movement of the tooth in one direction, and a spring mounted in the cup portions and yieldingly urging the projection against the socket and permitting the tooth to be moved in the opposite direction by an obstruction.

5. In agricultural apparatus, a frame adapted to travel in a straight path, rotary plows carried by the frame to form a furrow at one side of the path of travel of the frame and turn the plowed soil toward the opposite side of said path of travel, tooth members movably supported by the frame in spaced relation to each other and extending in a row oblique to the path of travel of the frame, eccentric members rotatably supported by the frame, and each eccentric member operatively and releasably connected to a tooth member to impart movement to the tooth members in an elliptical path, and means to operatively connect the eccentric members with the rotary plows and impart rotation of said plows to the eccentric members and actuate the tooth members to break up clods in the plowed soil, level the plowed soil and move unbroken clods toward the furrow.

6. In agricultural apparatus, a frame adapted to travel in a straight path, a row of rotary plows carried by the frame to extend obliquely to the path of travel of the frame and form a furrow at one side of the path of travel of the frame and turn the plowed soil toward the opposite side of said path of travel, a row of spaced tooth members movably supported by the frame to extend parallel to and at the rear of the plow, eccentric members rotatably supported by the frame, each eccentric member operatively and releasably connected to a tooth member to impart movement to the tooth members in an elliptical path, and means to operatively connect the eccentric members with the plows and transmit rotation of the plows to the eccentric members and actuate the tooth members to break up clods in the plowed soil, level the plowed soil and move unbroken clods toward the furrow.

7. In agricultural apparatus, a frame adapted to travel in a straight path, a row of rotary plows carried by the frame to extend obliquely of the path of travel of the frame and form a furrow at one side of the path of travel of the frame and turn the plowed soil toward the opposite side of said path of travel, spaced tooth members movably supported by the frame to extend in a straight line at one end and parallel of the row of plows and over a previously plowed strip of soil, eccentric members rotatably supported by the frame and each eccentric member operatively and releasably connected to a tooth member to impart movement to the tooth members in an elliptical path, and means to operatively connect the eccentric members with the plows and transmit rotation of the plows to the eccentric members and actuate the tooth members to move clods into a furrow of the previously plowed strip of soil.

8. In agricultural apparatus as claimed in claim 6, a second row of spaced tooth members movably supported by the frame to extend at one end and in a line parallel to the plows and over a previously plowed strip of soil, a second group of eccentric members rotatably supported by the frame and each of said eccentric members operatively connected to a tooth member of the second row of tooth members to impart movement to said second tooth members in an elliptical path, and means to operatively connect the second group of eccentric members with the plows and transmit rotation of the plows to said eccentric members and actuate the second row of tooth members to move clods into a furrow of the previously plowed strip of soil.

9. Agricultural apparatus as claimed in claim 6, wherein the tooth members are movably supported by the frame by sleeve members pivotally mounted on the frame and slidably supporting the tooth members, and means mounted in the sleeve members to engage and retain the tooth members in predetermined fixed position when said tooth members are disconnected from the associated eccentric members whereby certain of the tooth members may be actuated in an elliptical path while others of the tooth members are held in a fixed position.

HARRY G. TRAVER.

REFERENCES CITED

The following references are of record in the file of this patent:

UNITED STATES PATENTS

| Number | Name | Date |
|---|---|---|
| 274,962 | Nutting | Apr. 3, 1883 |
| 313,563 | Weddle | Mar. 10, 1885 |
| 428,895 | Davie | May 27, 1890 |
| 570,192 | Tucker | Oct. 27, 1896 |
| 817,083 | Moeller | Apr. 3, 1906 |
| 904,792 | Marvin | Nov. 24, 1908 |
| 976,643 | Eckroat et al. | Nov. 22, 1910 |
| 983,382 | Mahan | Feb. 7, 1911 |
| 1,165,097 | Hayes | Dec. 21, 1915 |
| 1,224,717 | Darby et al. | May 1, 1917 |
| 1,225,399 | Black | May 8, 1917 |
| 1,298,385 | Plumer | Mar. 25, 1919 |
| 1,596,838 | Houser | Aug. 17, 1926 |
| 2,045,376 | Stanelle | June 23, 1936 |
| 2,331,686 | Hintz | Oct. 12, 1943 |